United States Patent [19]

Imanishi et al.

[11] Patent Number: 5,807,203
[45] Date of Patent: Sep. 15, 1998

[54] TOROIDAL TYPE CONTINUOUSLY VARIABLE TRANSMISSION

[75] Inventors: Takashi Imanishi, Yokohama; Hisashi Machida; Nobuo Goto, both of Fujisawa, all of Japan

[73] Assignee: NSK Ltd., Tokyo, Japan

[21] Appl. No.: 713,567

[22] Filed: Sep. 12, 1996

[30] Foreign Application Priority Data

Sep. 22, 1995 [JP] Japan ................................. 7-244307

[51] Int. Cl.⁶ .......................... F16H 15/38; F16H 1/08
[52] U.S. Cl. ............................................. 476/42; 74/410
[58] Field of Search ............................ 74/410; 476/10, 476/40, 41, 42

[56] References Cited

U.S. PATENT DOCUMENTS 5,044,214   9/1991   Barber, Jr. ................................. 476/10

FOREIGN PATENT DOCUMENTS

| 62-258255 | 11/1987 | Japan . |
| 1-193454 | 8/1989 | Japan . |
| 4-69439 | 3/1992 | Japan . |
| 6-174037 | 6/1994 | Japan ................................. 476/42 |

Primary Examiner—Allan D. Herrman
Attorney, Agent, or Firm—Shapiro and Shapiro

[57] ABSTRACT

In order to improve the transmission efficiency of a toroidal type continuously variable transmission by reducing the dynamic torque loss of an antifriction bearing, a first output gear is constituted by a pair of helical gears of which the directions of inclinations are opposite to each other, and a second output gear is constituted by a double helical gear. By this construction, a thrust force created in the meshing portion between the first and second output gears is offset and the dynamic torque loss of the antifriction bearing is reduced.

13 Claims, 6 Drawing Sheets

TOROIDAL TYPE CONTINUOUSLY VARIABLE TRANSMISSION

BACKGROUND OF THE INVENTION

1. Field of the Invention

This invention relates to a toroidal type continuously variable transmission particularly available as a transmission for an automobile.

2. Related Background Art

Figure 6:
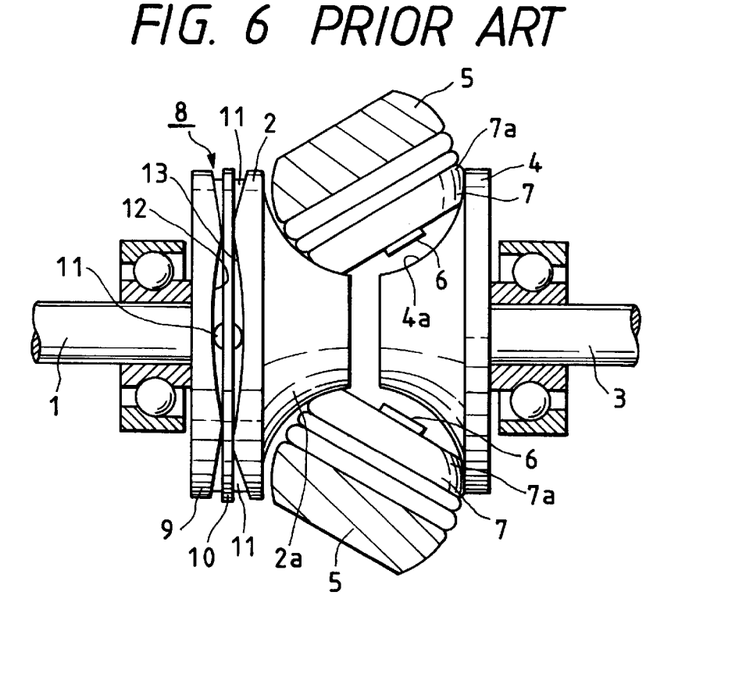
FIG. 6 is a side view showing the basic structure of a toroidal type continuously variable transmission in the state during maximum deceleration.
Figure 7:
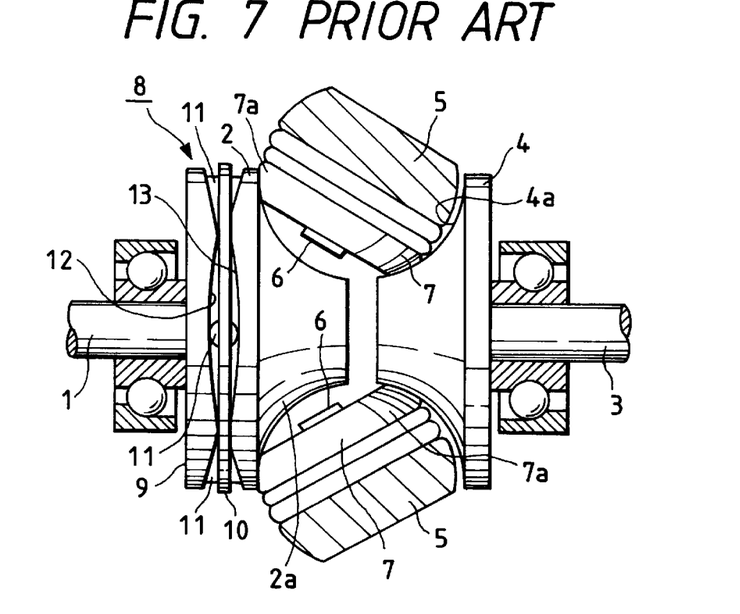
FIG. 7 is a side view showing the basic structure in the state during maximum acceleration.

It has been studied to use a toroidal type continuously variable transmission as schematically shown in FIGS. 6 and 7 of the accompanying drawings as a transmission for an automobile. This toroidal type continuously variable transmission has an input side disc 2 supported coaxially with an input shaft 1 rotatably journalled inside a housing, not shown, and an output side disc 4 fixed to the end portion of an output shaft 3 rotatably journalled also to the housing. On the inner surface of the housing containing the toroidal type continuously variable transmission therein or a support bracket provided in this housing, there are provided trunnions 5, 5 pivotally movable about a pivot lying at a position twisted relative to the input shaft 1 and the output shaft 3.

Each of the trunnions 5, 5 is formed of a metallic material having sufficient rigidity and has the pivot provided on the outer sides of the opposite end portions thereof. Also, power rollers 7, 7 are rotatably supported around displaceable shafts 6, 6 provided in the central portions of the trunnions 5, 5. These power rollers 7, 7 are sandwiched between the input side disc 2 and the output side disc 4.

On those axial surfaces of the input side and output side discs 2 and 4 which are opposed to each other, there are formed an input side concave surface 2a and an output side concave surface 4a of which the cross-sections are arcuate toroidal curved surfaces centering around a point on the center line of the pivot. The peripheral surfaces 7a, 7a of the power rollers 7, 7 formed of rotation-arcuate-surface-like convex surfaces are made to bear against the input side concave surface 2a and the output side concave surface 4a.

A pressing device 8 of the loading cam type is provided between the input shaft 1 and the input side disc 2, and the input side disc 2 is pressed toward the output side disc 4 by this pressing device 8. This pressing device 8 is comprised of a cam plate 9 rotatable with the input shaft 1, and a plurality of (e.g. four) rollers 11, 11 held by a holder 10. A first cam surface 12 which is a concave-convex surface over the circumferential direction is formed on one side surface (the right side surface as viewed in FIGS. 6 and 7) of the cam plate 9, and a second cam surface 13 of a similar shape is also formed on the outer side surface (the left side surface as viewed in FIGS. 6 and 7) of the input side disc 2. The plurality of rollers 11, 11 are rotatable about radial axes relative to the center of the input shaft 1. The input side disc 2 is supported for some sliding movement in the axial direction (the left to right direction as viewed in FIGS. 6 and 7) relative to the input shaft 1 and for rotation in the direction of rotation.

When the cam plate 9 rotates with the rotation of the input shaft 1 and a rotation phase difference occurs relative to the input side disc 2, the plurality of rollers 11, 11 slide onto the first cam surface 12 and the second cam surface 13 to thereby keep the cam plate 9 and the input side disc 2 away from each other. The cam plate 9 is supported on the input shaft 1 journalled to the housing by a bearing, against axial movement, and therefore the input side disc 2 is pushed toward the power rollers 7, 7, which are thus pushed toward the output side disc 4. On the other hand, the output side disc 4 is journalled only for rotation relative to a transmission case with the output shaft 3 and is not axially movable. Therefore, the power rollers 7, 7 are pressed between the input side disc 2 and the output side disc 4. By this pressing, an urging force is created between the peripheral surfaces 7a, 7a of the power rollers 7, 7 and the input side and output side concave surfaces 2a and 4a, and the rotation of the input side disc 2 does not slip but is transmitted to the output side disc 4 through the power rollers 7, 7, whereby the output shaft 3 fixed to the output side disc 4 is rotated.

When the rotational speed ratio (transmission gear ratio) of the input shaft 1 and the output shaft 3 is to be changed and a speed reduction is to be first effected between the input shaft 1 and the output shaft 3, the trunnions 5, 5 are pivotally moved about the pivot as shown in FIG. 6 and the displaceable shafts 6, 6 are inclined so that the peripheral surfaces 7a, 7a of the power rollers 7, 7 may bear against the portion near the center of the input side concave surface 2a and the portion near the outer periphery of the output side concave surface 4a, respectively. When conversely, a speed increase is to be effected, the trunnions 5, 5 are pivotally moved as shown in FIG. 7 and the displaceable shafts 6, 6 are inclined so that the peripheral surfaces 7a, 7a of the power rollers 7, 7 may bear against the portion near the outer periphery of the input side concave surface 2a and the portion near the center of the output side concave surface 4a, respectively. If the angle of inclination of the displaceable shafts 6, 6 is made medium between that of FIG. 6 and that of FIG. 7, a medium transmission gear ratio can be obtained between the input shaft 1 and the output shaft 3.

Figure 8:
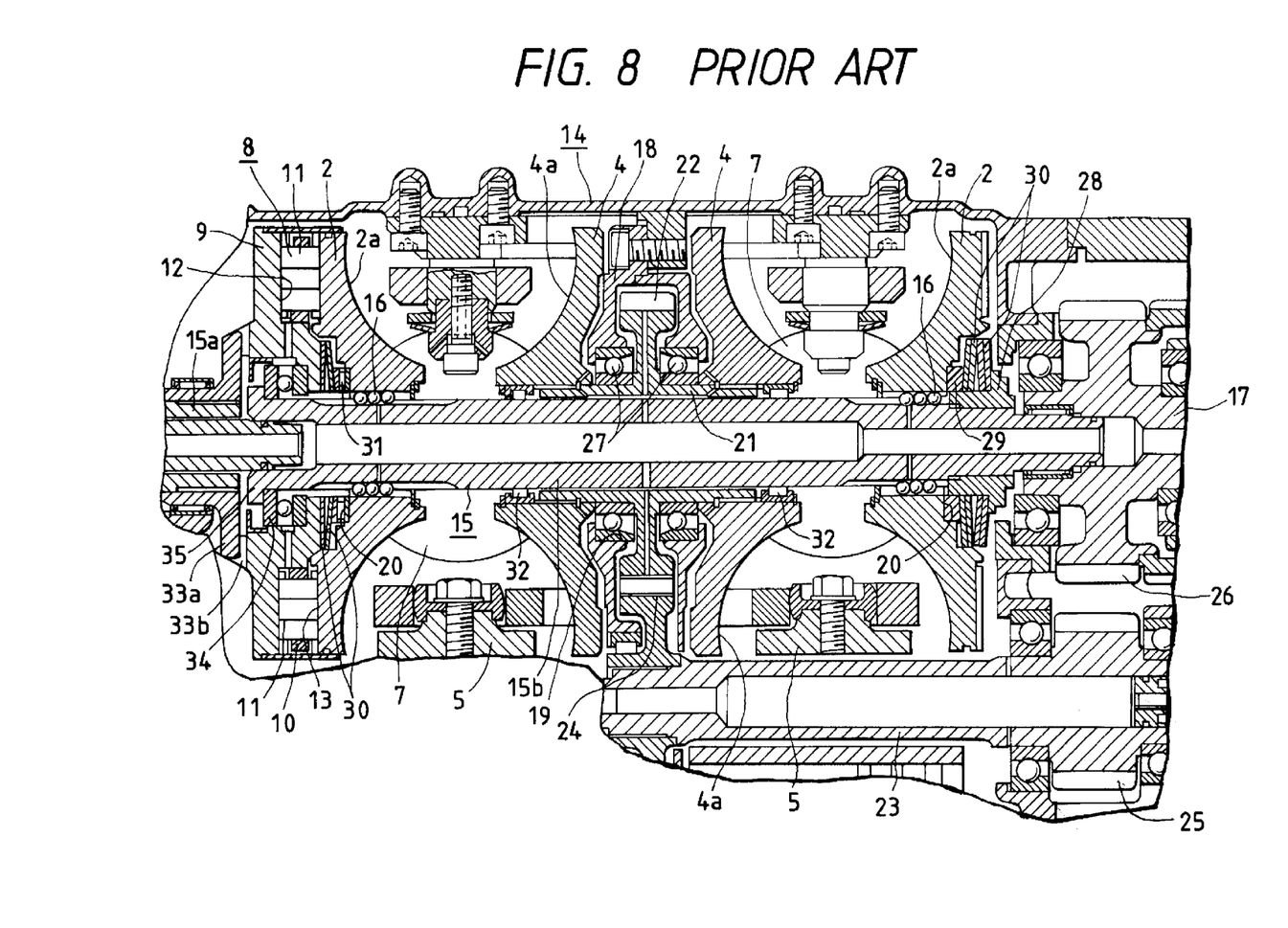
FIG. 8 is a cross-sectional view showing an example of the specific structure of a heretofore known toroidal type continuously variable transmission.

The basic structure and action of the toroidal type continuously variable transmission are as described above, but when such a toroidal type continuously variable transmission is utilized as a transmission for an automobile having an engine of great output, it is known as described, for example, in Japanese Laid-Open Patent Application No. 62-258255, Japanese Laid-Open Patent Application No. 1-193454, Japanese Laid-Open Patent Application No. 4-69439, etc. to provide two input side discs 2 and two output side discs 4 and arrange each two input side discs 2 and output side discs 4 in parallel to each other relative to the direction of transmission of power to make the transmission of great power possible. FIG. 8 of the accompanying drawings shows the structure described in Japanese Laid-Open Patent Application No. 4-69439.

In this prior-art structure, an input side rotary shaft 15 is supported inside a housing 14 only for rotation. This input side rotary shaft 15 comprises a fore half portion 15a coupled to the output side rotary shaft or the like of a clutch, and a rear half portion 15b somewhat rotatable relative to the fore half portion 15a. A pair of input side discs 2, 2 are supported near the opposite end portions of the rear half portion 15b corresponding to the first rotary shaft of the present invention in the axial direction thereof (the left to right direction as viewed in FIG. 8) through ball splines 16, 16 with the input side concave surfaces 2a, 2a of the input side discs 2, 2 opposed to each other. Recesses 20, 20 are formed in the central portions of the backs (the surfaces axially opposite to the input side concave surfaces 2a, 2a) of the input side discs 2, 2.

Between the inner surface of one of these recesses 20, 20 which is adjacent to the rear end side (the right side as viewed in FIG. 8) and a loading nut 28, a seat plate 29 and belleville springs 30, 30 are provided in series with each other. Also, between the inner surface of the recess 20 adjacent to the fore end side (the left side as viewed in FIG.

8) and the portion near the inner periphery of one surface (the right side surface as viewed in FIG. 8) of a cam plate 9, a thrust needle bearing 31 and belleville springs 30, 30 are provided in series with each other. This thrust needle bearing 31 compensates for the relative rotation of the cam plate 9 and the input side disc 2 on the fore end side. Also, pre-pressure toward output side discs 4, 4 which will be described next is imparted to the input side discs 2, 2 by the belleville springs 30, 30.

Around the intermediate portion of the rear half portion 15b, the pair of output side discs 4, 4 are supported for rotation relative to this rear half portion 15b with the output side concave surfaces 4a, 4a thereof and the input side concave surfaces 2a, 2a opposed to each other. Also, a plurality of power rollers 7, 7 rotatably supported on a plurality of trunnions 5, 5 through displaceable shafts 6, 6 (FIGS. 6 and 7) are sandwiched between the input side and output side concave surfaces 2a and 4a. The power rollers 7, 7 are inclined in synchronism with each other to make the transmission gear ratios between the input side discs 2, 2 and the output side discs 4, 4 coincident with each other.

Also, on that portion inside the housing 14 which is opposite to the fore half portion 15a, an output side rotary shaft 17 is supported coaxially with the rear half portion 15b of the input side rotary shaft 15 and rotatably independently of this rear half portion 15b. Rotation transmitting means as will be described next is provided between the output side rotary shaft 17 and the pair of output side discs 4, 4 to thereby make the rotation of the output side discs 4, 4 transmittable to the output side rotary shaft 17.

A partition wall 18 is provided in that portion inside the housing 14 which is between the pair of output side discs 4, 4. A tubular sleeve 21 is supported in the inside portion of a through-hole 19 formed in this partition wall 18 by a pair of antifriction bearings 27, 27. The pair of output side discs 4, 4 are spline-engaged with the opposite end portions of the sleeve 21. That is, male spline grooves formed in the outer peripheral surfaces of the opposite end portions of the sleeve 21 and female spline grooves formed in the inner peripheral surfaces of the output side discs 4, 4 are brought into meshing engagement with each other. Also, a first output gear 22 is secured to the intermediate portion of the sleeve 21 which is inside the partition wall 18. Further, roller bearings 32, 32 are provided between the inner peripheral surface of a portion protruding from the sleeve 21 and the outer peripheral surface of the rear half portion 15b. These roller bearings 32, 32 permit the relative rotation and axial relative displacement of the output side discs 4, 4 and the input side rotary shaft 15.

On the other hand, inside the housing 14, a transmission shaft 23 corresponding to the second rotary shaft of the present invention is rotatably supported in parallelism to the input rotary shaft 15 and the output side rotary shaft 17. A second output gear 24 fixed to one end (the left and as viewed in FIG. 8) of the transmission shaft 23 and the first output gear 22 are brought into direct meshing engagement with each other, and a third output gear 25 fixed to the other end (the right end as viewed in FIG. 8) of the transmission shaft 23 and a fourth output gear 26 fixed to the end portion of the output side rotary shaft 17 are brought into meshing engagement with each other through an idle gear, not shown. By such rotation transmitting means, the output side rotary shaft 17 is rotated in a direction opposite to the direction of rotation of the pair of output side discs 4, 4 with the rotation of these output side discs 4, 4. The transmission shaft 23 itself can be made to function as the output shaft of the toroidal type continuously variable transmission, and besides the output side rotary shaft 17, the third and fourth output gears 25 and 26 and the idle gear can be omitted.

Further, a pressing device 8 of the loading cam type is provided between the fore half portion 15a and one (the left as viewed in FIG. 8) input side disc 2. By this pressing device 8, this one input side disc 2 can be axially pressed toward the output side disc 4 opposed thereto while the one input side disc 2 is rotated with the rotation of the fore half portion 15a which is the other member than the first rotary shaft. For this purpose, an engagement portion 33a formed on the outer peripheral surface of the rear end portion of the fore half portion 15a and an engagement portion 33b formed on the back of a cam plate 9 constituting the pressing device 8 are brought into concave-convex engagement with each other. A thrust ball bearing 34 is provided between this cam plate 9 and a flange portion 35 formed on the outer peripheral surface of the fore end portion of the rear half portion 15b. This thrust ball bearing 34 permits the relative displacement of the cam plate 9 and the rear half portion 15b in the direction of rotation while supporting a thrust load acting on the cam plate 9, during the operation of the pressing device 8.

During the operation of the toroidal type continuously variable transmission shown in FIG. 8 which is constructed as described above, the pair of input side discs 2, 2 are rotated at a time with the rotation of the input side rotary shaft 15, and this rotation is transmitted to the pair of output side discs 4, 4 at a time and at the same transmission gear ratio and is transmitted to the output side rotary shaft 17 by the above-described transmitting means and is taken out. At this time, the transmission of the rotational force is effected in two routes parallel to each other and therefore, great power (torque) becomes transmittable. Also, during the operation, the spacing between the pair of input side discs 2, 2 tends to be narrowed by the work of the pressing device 8. As a result, the input side concave surfaces 2a, 2a of the input side discs 2, 2 and the output side concave surfaces 4a, 4a of the output side discs 4, 4 and the peripheral surfaces 7a, 7a of the power rollers 7, 7 strongly bear against one another and the transmission of power is effected efficiently.

The output gears 22 and 24–26 constituting the rotation transmitting means are helical gears. This is for reducing the noise (meshing sound) occurring in the meshing portions of the output gears 22 and 24–26 during the operation of the toroidal type continuously variable transmission. With the fact that the output gears 22 and 24–26 are helical gears, thrust forces are created in the meshing portions of the first to fourth output gears 22 and 24–26 during the operation of the toroidal type continuously variable transmission. For example, the thrust force created in the meshing portion between the first and second output gears 22 and 24 presses the sleeve 21 to which the first output gear 22 is secured and the transmission shaft 23 to which the second output gear 24 is secured to the axially opposite side. Regarding the transmission shaft 23, the thrust force can also be offset by the directions of inclination of (the helical angle of) the second and third output gears 24 and 25 being made opposite to each other. However, regarding the sleeve 21 on which only the first output gear 22 is provided, the thrust force cannot be offset by such a method.

Therefore, as the antifriction bearings 27, 27 for rotatably supporting the sleeve 21 relative to the housing 14, use has heretofore been made of ones which can support not only a radial load but also a thrust load. More specifically, ball bearings of the angular type have been used as the antifriction bearings 27, 27 and a thrust force applied from the first output gear 22 to the sleeve 21 has been made supportable.

However, in the case of structure in which a thrust force created in the sleeve 21 is left as it is and this thrust force is supported by the antifriction bearings 27, 27, dynamic torque loss occurring in the antifriction bearings 27, 27 during the operation of the toroidal type continuously variable transmission becomes great. Therefore, the transmission efficiency of the toroidal type continuously variable transmission is reduced and the power performance of an automobile incorporating this toroidal type continuously variable transmission therein is correspondingly lessened. Also, it is not preferable from the viewpoint of securing the durability of the antifriction bearings 27, 27 that an excess thrust force is applied to these antifriction bearings 27, 27.

SUMMARY OF THE INVENTION

The present invention has as an object the provision of a toroidal type continuously variable transmission in which the creation of an unnecessary thrust force is prevented and which is improved in transmission efficiency.

The toroidal type continuously variable transmission of the present invention, like the aforedescribed toroidal type continuously variable transmission according to the prior art, is provided with a housing, a first rotary shaft rotatably supported inside the housing, a pair of input side discs having their respective axial one surface made into an input side concave surface of arcuate cross-sectional shape, and supported on the axially opposite end portions of the first rotary shaft for rotation with the first rotary shaft with the input side concave surfaces opposed to each other, a cylindrical sleeve rotatable and axially displaceable relative to the first rotary shaft and rotatably supported inside the housing by an antifriction bearing, a first output gear secured to the outer peripheral surface of the intermediate portion of the sleeve, a second rotary shaft disposed parallel to the first rotary shaft and rotatably supported inside the housing, a second output gear fixed to the second rotary shaft and meshing with the first output gear, a pair of output side discs having their respective axial one surface made into an output side concave surface of arcuate cross-sectional shape, and supported on the axially opposite end portions of the sleeve for rotation with the sleeve with the output side concave surfaces and the input side concave surfaces opposed to each other, a plurality of trunnions pivotally movable about a pivot lying at a position twisted relative to the first rotary shaft, a plurality of power rollers having their peripheral surfaces made into rotation-arcuate-surface-like convex surfaces, and rotatably supported on displaceable shafts supported by the trunnions and sandwiched between the input side and output side concave surfaces, and a pressing device of the loading cam type for rotating one of the pair of input side discs with the rotation of the other members than the first rotary shaft while axially pressing the one input side disc toward the output side disc to which the one input side disc is opposed.

In the toroidal type continuously variable transmission of the present invention, the first and second output gears includes a pair of helical gear portions of which the directions of inclination are opposite to each other, thereby negating a thrust force created in the meshing portion between the first and second output gears.

The action when the toroidal type continuously variable transmission of the present invention constructed as described above effects the transmission of power between the pair of input side discs rotatable with the input side rotary shaft and the pair of output side discs supported on the opposite end portions of the sleeve, and the action when it changes the rotational speed ratio between the input side discs and the output side discs are generally similar to the case of the aforedescribed toroidal type continuously variable transmission according to the prior art.

In the case of the toroidal type continuously variable transmission of the present invention, the thrust force created in the meshing portion between the first and second output gears, however, is negated and therefore, the dynamic torque loss of the antifriction bearing for rotatably supporting the sleeve relative to the housing is small. As a result, the transmission efficiency of the toroidal type continuously variable transmission can be made sufficiently high. Also, the durability of the antifriction bearing can be sufficiently secured.

DESCRIPTION OF THE PREFERRED EMBODIMENTS

Figure 1:
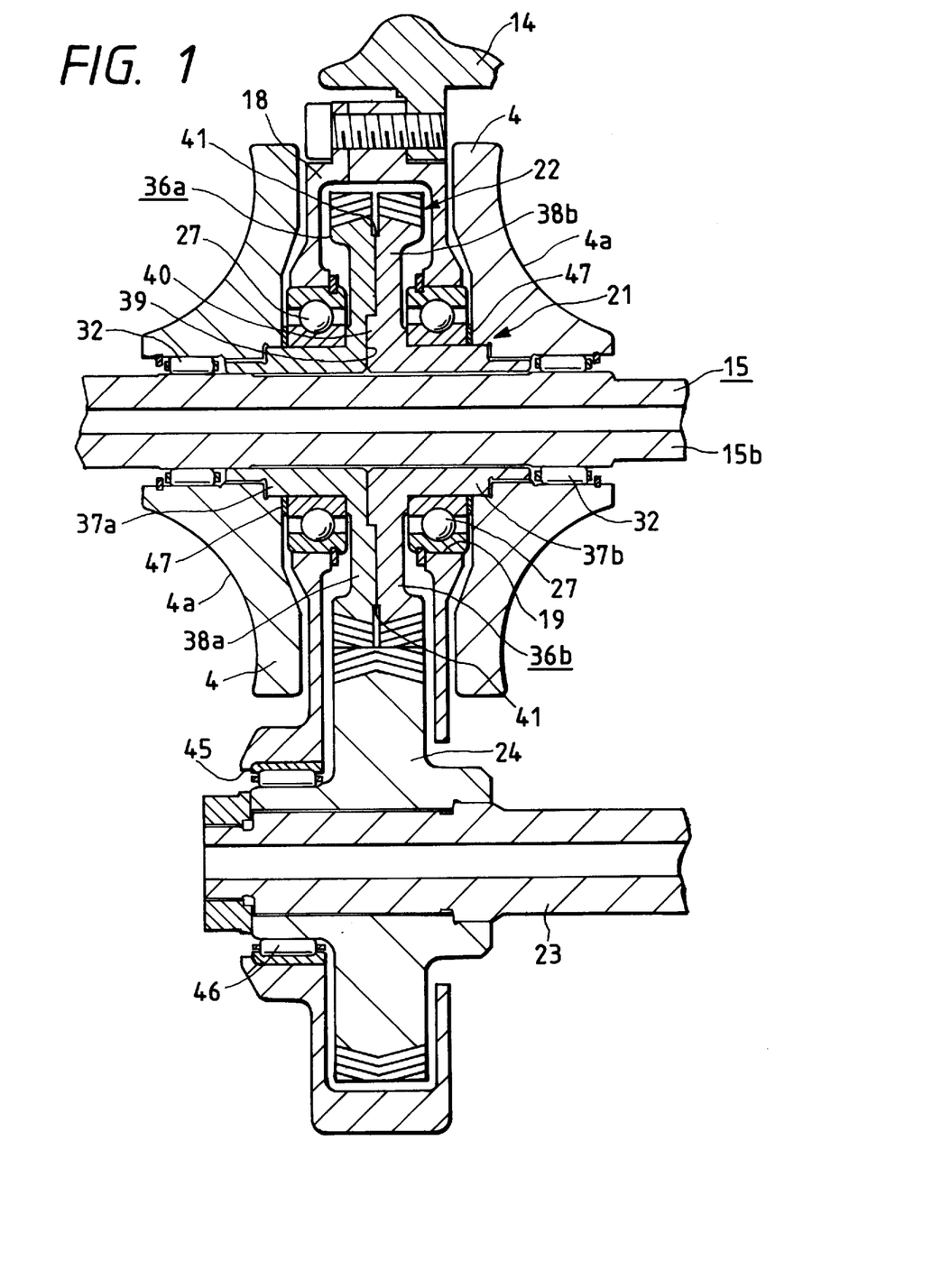
FIG. 1 is a cross-sectional view corresponding to the central portion of FIG. 8, but showing a first embodiment of the present invention.

FIG. 1 shows a first embodiment of the present invention. A feature of the present invention resides in that the shapes of first and second output gears 22 and 24 meshing with each other are contrived to improve the transmission efficiency as an entire toroidal type continuously variable transmission. The details of the shapes, etc. of the other constituent members are similar to those in the heretofore known toroidal type continuously variable transmission as shown, for example, in FIGS. 6 to 8. Accordingly, regarding the similar portions, showing and description will be omitted or simplified and description will hereinafter be made chiefly of the characteristic portions of the present invention.

In the case of the illustrated embodiment, a sleeve 21 and a first output gear 22 are constructed by combining a pair of gear elements 36a and 36b circumferentially displaceably relative to each other. Cylindrical portions 37a and 37b are formed on the inner peripheral edge portions of these gear elements 36a and 36b, and the sleeve 21 is constructed by coupling these cylindrical portions 37a and 37b axially in series with each other. Also, the inner peripheral surfaces of the base halves of output side discs 4, 4 are serration-engaged with the outer end portions of the cylindrical portions 37a, 37b, and roller bearings 32, 32 are provided between the inner peripheral surfaces of the fore half portions of the output side discs 4, 4 and the outer peripheral surface of the rear half portion 15b of an input side rotary shaft 15 which is a first rotary shaft.

Outwardly directed flange-like flange portions 38a, 38b are formed on the outer peripheral surfaces of the inner end portions of the cylindrical portions 37a, 37b and teeth are formed on the outer peripheral surfaces of these flange portions 38a, 38b to thereby make these flange portions 38a, 38b into gears. The gears constituted by these flange portions 38a, 38b are helical gears, but between the two flange portions 38a and 38b, the directions of inclination of the helical angles are made opposite to each other and the angles of inclination thereof are made equal to each other. The helical gears 38a, 38b differ from their actually seen shapes, but are schematically shown so as to make them readily understood. These two flange portions 38a, 38b abut each other to thereby constitute the first output gear 22. A circular concave portion 39 and a convex portion 40 centering around the cylindrical portions 37a and 37b, respectively, and closely fitted to each other are formed on those portions of near the inner peripheries of the inner sides of the pair of flange portions 38a, 38b so that the positional relation between the two flange portions 38a, 38b may move circumferentially but may not deviate diametrally. Also, stepped portions 41, 41 are formed on those portions near the outer peripheries of the inner sides of the pair of flange portions 38a, 38b, and a gap is interposed between the teeth formed on the outer peripheries of these two flange portions 38a, 38b. The teeth of the helical gears constituted by these two flange portions 38a, 38b are positionally adjustable in the circumferential direction and therefore, irrespective of an unavoidable working error or the like, the meshing state with a second output gear 24 which will be described later can be made uniform and the occurrence of meshing sound can be prevented.

Also, antifriction bearings 27, 27 are provided between the outer peripheral surfaces of the cylindrical portions 37a, 37b constituting the gear elements 36a, 36b and the inner peripheral surface of a through-hole 19 formed in a partition wall 18 in a housing 14. By these antifriction bearings 27, 27, the first output gear 22 constituted by the gear elements 36a, 36b is rotatably supported inside the housing 14. Unlike the case of the aforedescribed prior-art structure shown in FIG. 8, in the case of the present embodiment, ball bearings of the deep groove type are used as the antifriction bearings 27, 27.

Regarding the transmission shaft 23, a second output gear 24 is fixed to the end portion of the transmission shaft 23 which is a second rotary shaft disposed parallel to the input side rotary shaft 15 and rotatably supported inside the housing 14. This second output gear 24 is made into a double helical gear (schematically shown) meshing with the first output gear 22. As described above, in the case of the present embodiment, of the first and second output gears 22 and 24 meshing with each other, the first output gear 22 is made into a pair of helical gears of which the directions of inclination are opposite to each other and the second output gear 24 is made into a double helical gear, thereby negating a thrust force created in the meshing portion between these two output gears 22 and 24.

Thus, in the case of the toroidal continuously variable transmission of the present invention, the thrust force created in the meshing portion between the first and second output gears 22 and 24 is negated. Therefore, a thrust load applied to the antifriction bearings 27, 27 for supporting the sleeve 21 relative to the housing is very much limited. Accordingly, any other great force than a radial load created as a reaction force in the meshing portion between the first and second output gears 22 and 24 is not applied to the antifriction bearings 27, 27 and the dynamic torque loss of these antifriction bearings 27, 27 becomes less. As a result, the transmission efficiency of the toroidal type continuously variable transmission can be made sufficiently high. Also, the durability of the antifriction bearings 27, 27 can be sufficiently secured.

Further, since the thrust force created in the meshing portion between the first and second output gears 22 and 24 is negated and is not transmitted to the sleeve 21, a moment for inclining this sleeve 21 becomes null. Therefore, a moment for inclining the output side discs 4, 4 supported on the opposite end portions of this sleeve 21 is not created. As a result, a non-uniform radial load is not applied to roller bearings 32, 32 supporting the output side discs 4, 4 and thus, the durability of these roller bearings 32, 32 is improved. In contrast, in the case of the prior-art structure shown in FIG. 8, a non-uniform radial load in the axial direction is applied to the roller bearings 32, 32 on the basis of a thrust force created in the meshing portion between the first and second output gears 22 and 24. Therefore, it becomes difficult to secure the durability of the roller bearings 32, 32.

Figure 2:
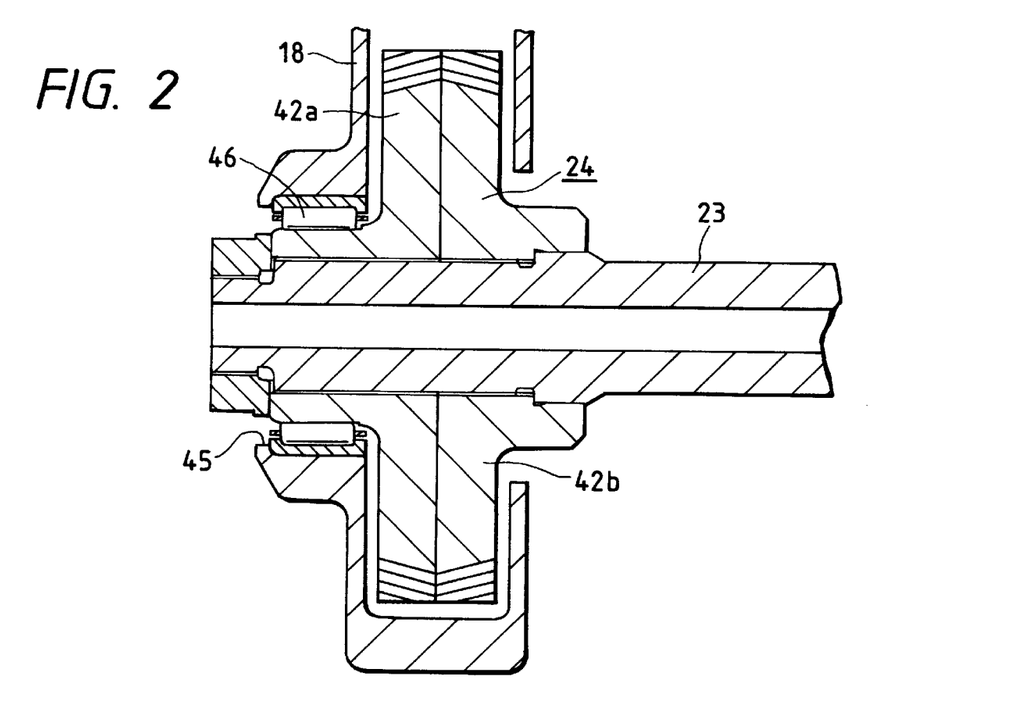
FIG. 2 is a cross-sectional view corresponding to the lower half of FIG. 1, but showing a second embodiment of the present invention.

FIG. 2 shows a second embodiment of the present invention. In the case of this embodiment, the second output gear 24 is constructed by making a pair of gear elements 42a and 42b abut each other. These gear elements 42a and 42b are made into helical gears by forming teeth (helical angles) opposite to each other in the direction of inclination on their respective outer peripheral surfaces. Such a second output gear 24 meshes with the first output gear 22 as shown in FIG. 1 to thereby constitute the toroidal type continuously variable transmission of the present invention.

Figure 3:
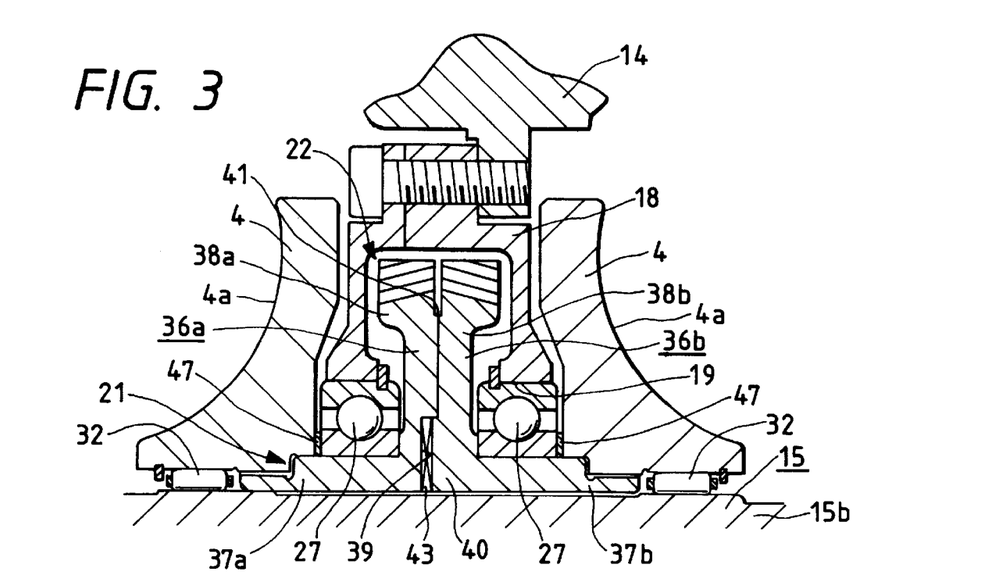
FIG. 3 is a cross-sectional view corresponding to the upper half of FIG. 1, but showing a third embodiment of the present invention.

FIG. 3 shows a third embodiment of the present invention. In the case of this embodiment, a thrust bearing 43 is interposed between a pair of gear elements 36a and 36b constituting the first output gear 22, whereby the positional adjustment of these gear elements 36a and 36b in the circumferential direction thereof may be accomplished smoothly. That is, the positional relation between these gear elements 36a and 36b in the circumferential direction thereof is adjusted to the optimum position with the first gear element 22 and the second gear element 24 (FIG. 1) brought into meshing engagement with each other, but by the thrust bearing 43 being provided, this adjustment may be accomplished smoothly. As the thrust bearing 43, use can be made of a plain bearing or a needle bearing.

Figure 4:
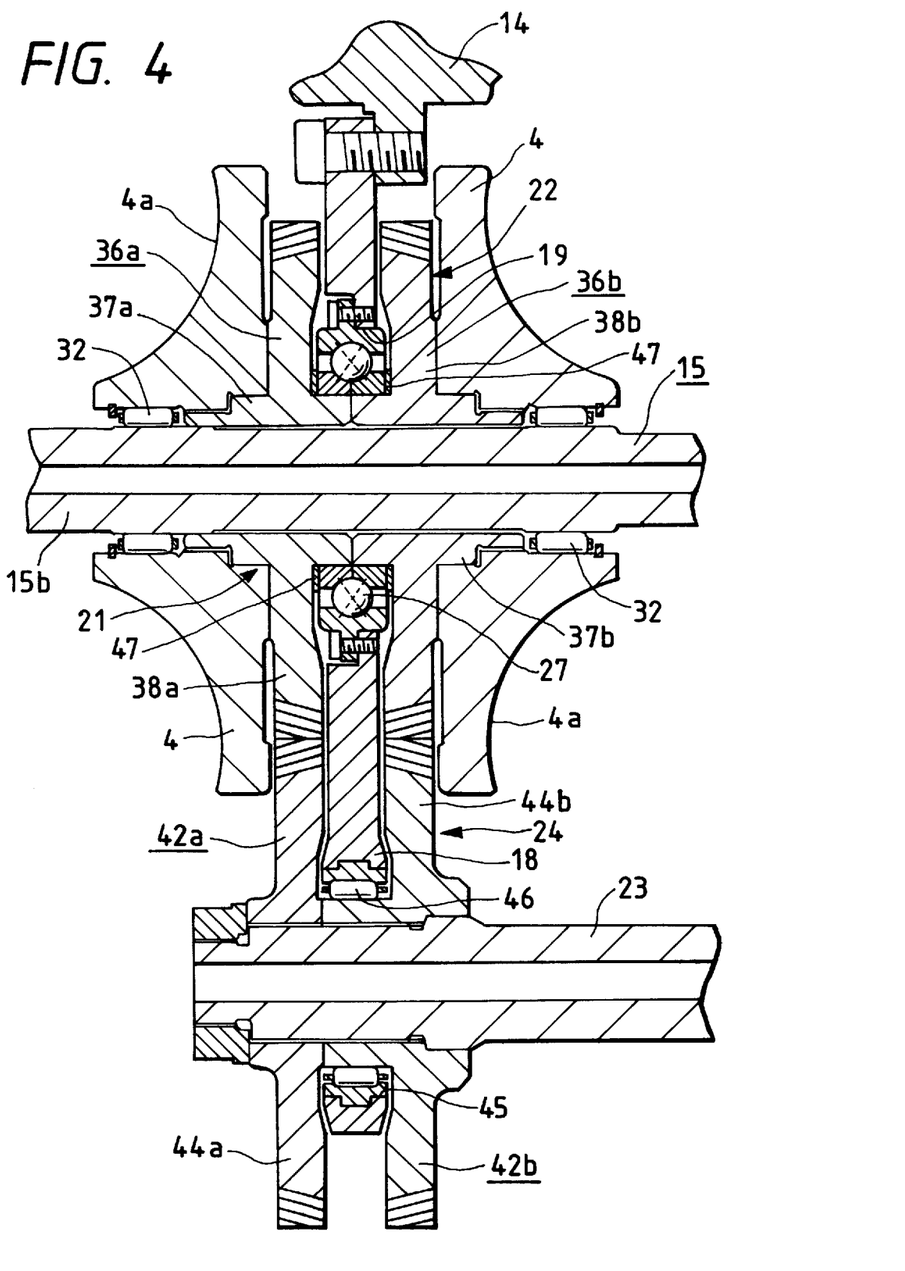
FIG. 4 is a cross-sectional view similar to FIG. 1, but showing a fourth embodiment of the present invention.

FIG. 4 shows a fourth embodiment of the present invention. In the case of this embodiment, the flange portions 38a, 38b of the pair of gear elements 36a, 36b constituting the first output gear 22 are axially (in the left to right direction as viewed in FIG. 4) spaced apart from each other, and the flange portions 44a, 44b of the pair of gear elements 42a, 42b constituting the second output gear 24 are axially spaced apart from each other. The flange portions 38a, 38b and the flange portions 44a, 44b constitute helical gears of which the directions of inclination are opposite to each other. The partition wall 18 in the housing 14 is disposed between the flange portions 38a and 38b and between the flange portions 44a and 44b. Further, in the case of the present embodiment, a ball bearing of the four-point contact type is used as the antifriction bearing 27 for rotatably supporting the cylindrical portions 37a, 37b constituting the pair of gear elements 36a, 36b inside the through-hole 19 in the partition wall 18. Also, the second output gear 24 is rotatably supported inside a thorough-hole 45 formed in the partition wall 18, by a roller bearing 46.

In the case of the present embodiment constructed as described above, it is not necessary to make the partition wall 18 into double structure and one antifriction bearing 27 for supporting the sleeve 21 suffices. Accordingly, it becomes possible to simplify the structure of the whole and make it compact and light in weight.

Figure 5:
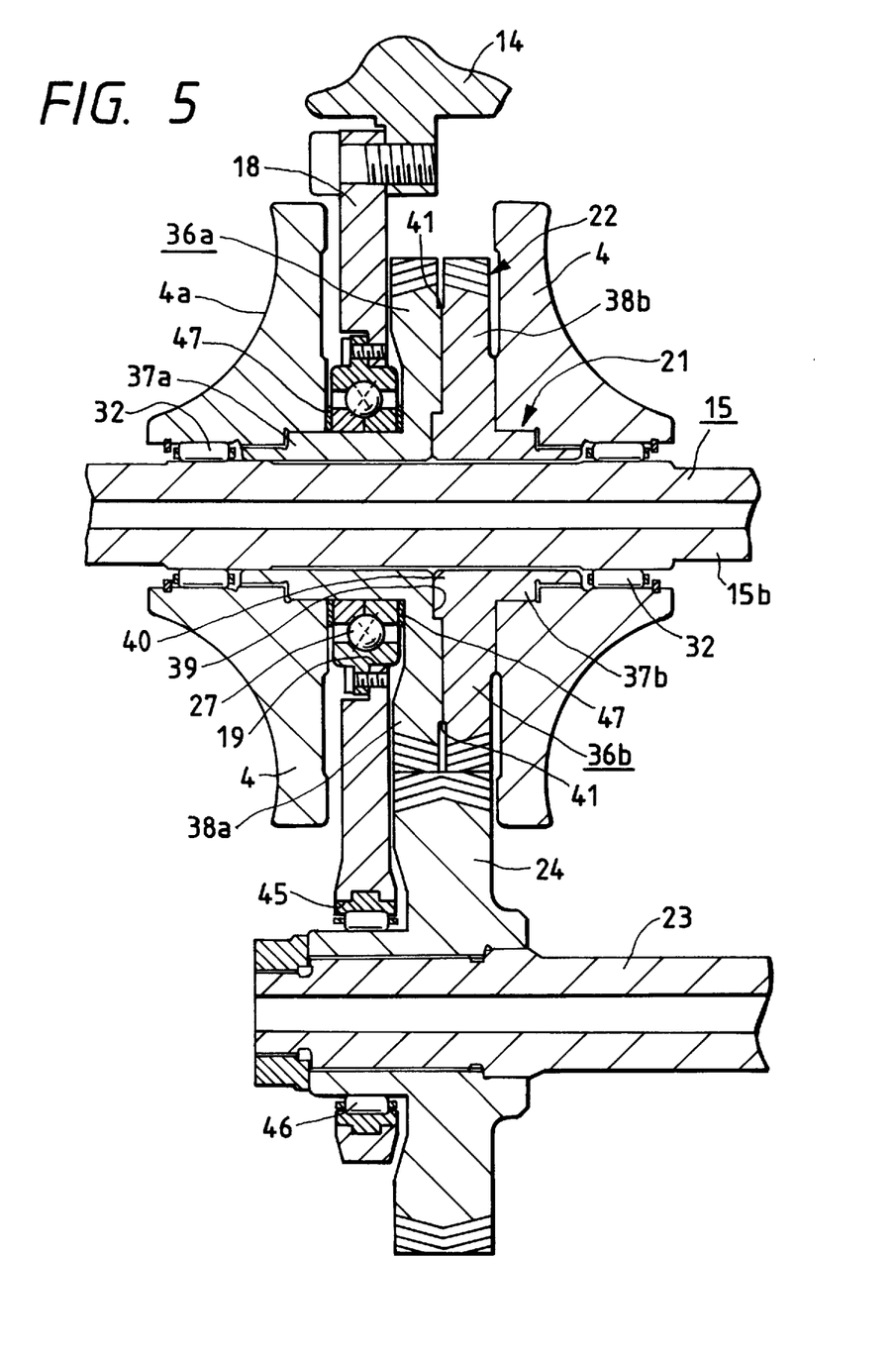
FIG. 5 is a cross-sectional view similar to FIG. 1, but showing a fifth embodiment of the present invention.

FIG. 5 shows a fifth embodiment of the present invention. This embodiment has such structure in which the aforedescribed first embodiment and the aforedescribed fourth embodiment are combined together. That is, in the case of the present embodiment, the first output gear 22 and the second output gear 24 are a combination of helical gears and a double helical gear similar to those in the first embodiment, and these two gears 22 and 24 are disposed on one side (the right side as viewed in FIG. 5) of the partition wall 18 of single-plate structure. The first output gear 22 and the second output gear 24 are rotatably supported inside the through-holes 19 and 45, respectively, in the partition wall 18 by an antifriction bearing 27 which is a ball bearing of the four-point contact type and a roller bearing 46, respectively. Again in the case of the present embodiment, as in the above-described fourth embodiment, the compactness and lighter weight of the toroidal type continuously variable transmission can be achieved.

In each of the illustrated embodiments, spacers 47, 47 are sandwiched between the end surface of an inner race constituting the antifriction bearing 27 and the surface opposed thereto as required to thereby adjust the axial positions of the sleeve 21 and the output side discs 4, 4 supported on this sleeve 21. Although not shown, both of the first and second output gears 22 and 24 may be double helical gears.

The toroidal type continuously variable transmission of the present invention is constructed and acts as described above and therefore, can provide a toroidal type continuously variable transmission which reduces the transmission loss of power therein and which is good in efficiency. As a result, the power performance and fuel consumption performance of an automobile incorporating the toroidal type continuously variable transmission therein can be improved. Further, the present invention can secure the durability of the antifriction bearing for supporting the sleeve and can also contribute to the improvements in the reliability and durability of the toroidal type continuously variable transmission.

What is claimed is:

1. A toroidal type continuously variable transmission, comprising:

a housing;

a first rotary shaft rotatably supported inside the housing;

a pair of input side discs, each having an axial surface made into an input side concave surface of arcuate cross-sectional shape, said input side discs being supported on axially opposite end portions of said first rotary shaft for rotation with said first rotary shaft, and said input side concave surfaces being opposed to each other;

a cylindrical sleeve rotatable and axially displaceable relative to said first rotary shaft and rotatably supported inside said housing by an antifriction bearing;

a first output gear disposed on an outer peripheral surface of an intermediate portion of said sleeve for rotation with said sleeve;

a second rotary shaft disposed parallel to said first rotary shaft and rotatably supported inside said housing;

a second output gear fixed to said second rotary shaft and meshing with said first output gear;

a pair of output side discs, each having an axial surface made into an output side concave surface of arcuate cross-sectional shape, said output side discs being supported on axially opposite end portions of said sleeve for rotation with said sleeve and each having its output side concave surface facing the input side concave surface of a corresponding one of said input side discs;

a plurality of trunnions pivotally movable about respective pivot axes transverse to said first rotary shaft;

a plurality of power rollers, each having a peripheral surface made into rotation-arcuate-surface-like convex surface and being rotatably supported on a corresponding displaceable shaft supported by a corresponding one of said trunnions, each power roller also being sandwiched between the input side and output side concave surfaces of a corresponding pair of said input and output side discs; and a pressing device of the loading cam type for rotating one of said pair of input side discs while axially pressing said one input side disc toward the output side disc to which said one input side disc is opposed, wherein each of said first output gear and said second output gear includes a pair of helical gear portions having opposite directions of teeth inclination, respectively, thereby negating a thrust force created in the meshing portion between said first and second output gears.

2. The toroidal type continuously variable transmission of claim 1, wherein the antifriction bearing rotatably supporting said cylindrical sleeve inside said housing is a deep groove ball bearing.

3. The toroidal type continuously variable transmission of claim 1, wherein said second output gear is formed by a pair of helical gears of which the respective directions of inclination teeth are opposite to each other.

4. The toroidal type continuously variable transmission of claim 1, wherein said first output gear is formed by a pair of helical gears of which the respective directions of teeth inclination are opposite to each other, and a thrust bearing is interposed between said helical gears.

5. The toroidal type continuously variable transmission of claim 1 wherein each of said first output pear and said second output gear is formed by a pair of helical gears of which the respective directions of teeth inclination are opposite to each other, and each said pair of helical gears is rotatably supported relative to said housing by a bearing disposed between that pair of helical gears.

6. The toroidal type continuously variable transmission of claim 5, wherein the bearing disposed between the pair of helical gears forming said first output gear is a four-point contact ball bearing.

7. The toroidal type continuously variable transmission of claim 1, wherein two antifriction bearings sandwich said helical gear portions of said first output gear therebetween to rotatably support those helical gear portions relative to said housing.

8. The toroidal type continuously variable transmission of claim 1, wherein said first output gear is formed by a pair of helical gears of which the respective directions of teeth inclination are opposite to each other, and said pair of helical gears is rotatably supported relative to said housing by a bearing disposed between said pair of helical gears.

9. The toroidal type continuously variable transmission of claim 8, wherein the bearing disposed between said pair of helical gears is a four-point contact ball bearing.

10. The toroidal type continuously variable transmission of claim 1, wherein the helical gear portions of one of said output gears are sandwiched by two antifriction bearings to rotatably support those helical gear portions relative to said housing.

11. The toroidal type continuously variable transmission of claim 10, wherein said one of said output gears is formed by a pair of helical gears of which the respective directions of teeth inclination are opposite to each other.

12. The toroidal type continuously variable transmission of claim 1, wherein the helical gear portions of one of said output gears sandwich an antifriction bearing which rotatably supports those helical gear portions relative to said housing.

13. The toroidal type continuously variable transmission of claim 12, wherein said one of said output gears is formed by a pair of helical gears of which the respective directions of teeth inclination are opposite to each other.

* * * * *